United States Patent [19]

Willis

[11] 4,171,919
[45] Oct. 23, 1979

[54] CONNECTION WHICH WILL DISCONNECT UNDER PREDETERMINED FORCE

[76] Inventor: Jeffrey W. Willis, 6803 Kelburn La. NE., Cedar Rapids, Iowa 52402

[21] Appl. No.: 953,365

[22] Filed: Oct. 23, 1978

[51] Int. Cl.² .................. B25G 3/00; F16B 7/00
[52] U.S. Cl. .................................. 403/11; 40/607;
   52/726; 403/364; 403/393; 403/DIG. 3;
   403/DIG. 4
[58] Field of Search .............. 403/2, 11, 339, 340,
   403/220, 291, 364, 393, DIG. 3, DIG. 4; 52/98,
   726; 285/1, 2, 3; 40/607, 608, 612

[56] References Cited

U.S. PATENT DOCUMENTS

| 534,732 | 2/1895 | Titcomb | 403/339 |
| 2,571,281 | 10/1951 | Neher | 403/220 X |

FOREIGN PATENT DOCUMENTS 780702  5/1935  France ............................ 403/339

*Primary Examiner*—Wayne L. Shedd
*Attorney, Agent, or Firm*—Allan L. Harms

[57] ABSTRACT

A detachable connection for use in applications where detachment or shear of the connection is desirable or foreseen as a necessity. An improvement in a connection between two structural elements having identical, but oppositely oriented complemental connecting portions which mate, forming an enclosed space through which is inserted a deformable coupling member with cross section different from the cross section of the enclosed space. The improved connection will disconnect when subjected to predetermined forces, leaving the oppositely oriented structural elements undamaged.

9 Claims, 13 Drawing Figures

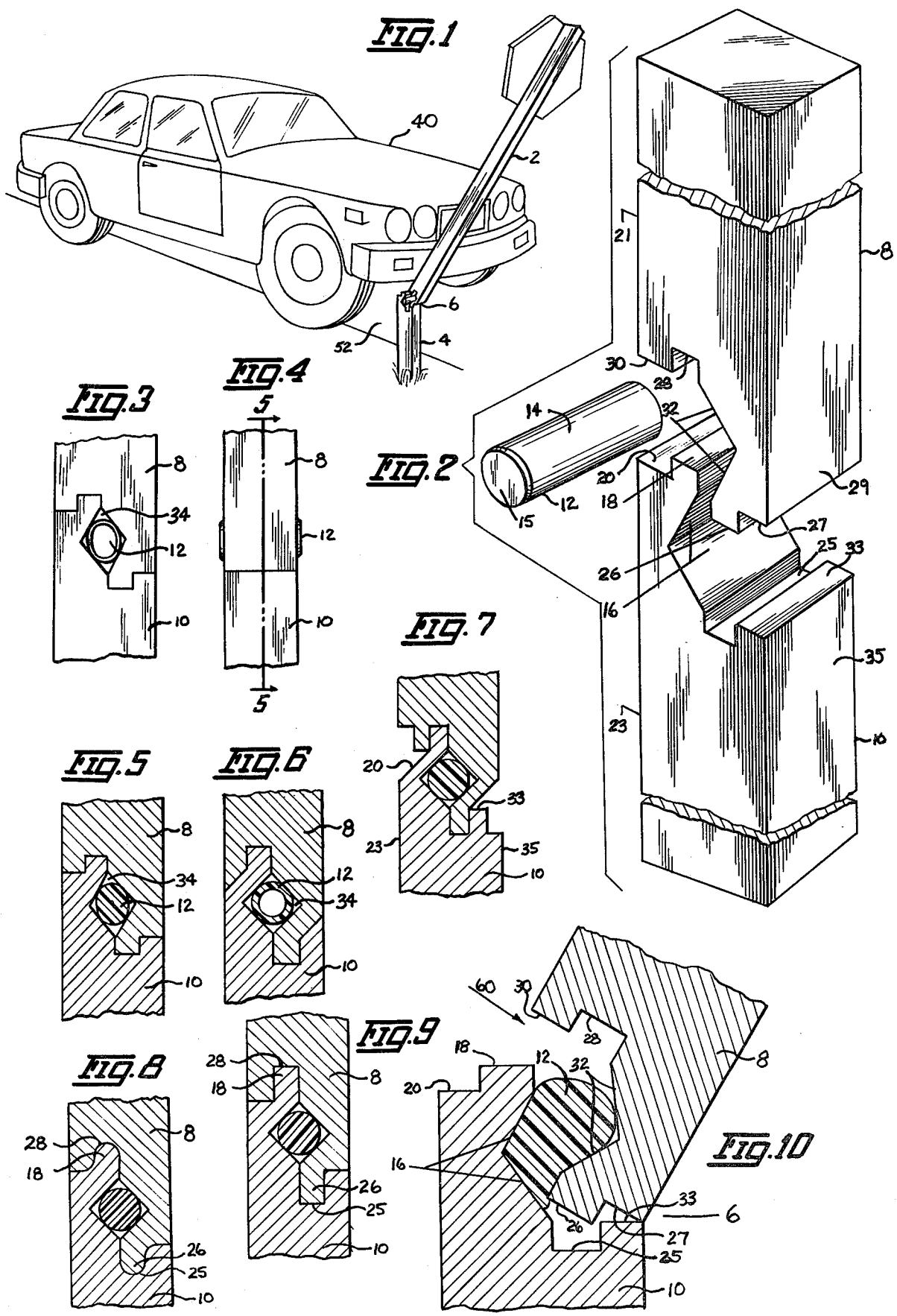

CONNECTION WHICH WILL DISCONNECT UNDER PREDETERMINED FORCE

SUMMARY OF THE INVENTION

This invention relates to a detachable connection for use to connect, either temporarily or permanently, adjacent structural elements.

The device consists of oppositely oriented components, which when engaged form an enclosed space with a retaining member of suitable material, depending upon the application, inserted in the space formed by the mating of the oppositely oriented elements, said retaining member being of different cross section or shape than the enclosed space formed by the mated structural elements or being hollow or made of resilient material.

The connection is especially applicable in the fabrication and repair of items which are meant to be easily disassembled, which are subject to shear forces, either by design or by realistic foresight, or which are subject to expansion and contraction. Sign posts, traffic signal poles, and other vertical structures, which are likely to be struck by vehicular traffic in the course of accidents on the roadway, would provide prime uses for this device. Also, the device is valuable in the connection of items such as box covers, toys, cargo containers, truck bed-to-box connections and bridge expansion joints.

One object of the invention is to provide a connection to be embodied in a vertical post which will shear under a given force while leaving the structural members intact, except for the retaining member. The shorn post may be repaired by engaging the opposite surfaces of the connection members and inserting a new retaining member in the enclosure created.

Another object of the invention is to provide a connection which may be easily disconnected without damage to the structures being detached or to the connection members.

Another object is to provide a connection which will detach under force, the required force to effect detachment which may vary by minor changes in the connection after it has been fabricated in or attached to the structures to be fastened.

Another object is to provide a highway signpost which will shear off when struck by a vehicle, thus reducing the risk of injury to occupants of such vehicle while leaving parts of the signpost which may be reconnected with ease and convenience and lack of expense.

Another object is to provide an expandable joint for structures such as bridges.

Another object is to provide a studry detachable connection for industrial use in the attachment of truck box enclosures to a truck flatbed to increase the versatility of the truck.

Previously, connections comprising oppositely oriented components mated together forming an enclosed space required the insertion of a bar, rod or other coupling member of the same cross section as the enclosed space created. Furthermore, previous devices provided for force fit or slide fit of the coupling member or end plates for purposes of securing the oppositely oriented components. The instant invention shows the improvement where the connection is detachable under a predetermined force, need not be longitudinal and where the inserted coupling member need not be of the same cross section as the enclosed space formed by the assembled oppositely oriented elements. It also shows the improvement of a connector which can partially disconnect under slight force, yet return to its completely attached state after removal of the force upon it.

DESCRIPTION OF THE DRAWINGS

FIG. 1 is a perspective view of the invention incorporated in a signpost with shear force applied.

FIG. 2 is an exploded perspective view of the invention.

FIG. 3 is a front elevation of an embodiment of the invention.

FIG. 4 is a side elevation of the embodiment of FIG. 3.

FIG. 5 is a section view along line 5—5 of FIG. 4.

FIG. 6 is a section through an alternative embodiment of the invention using a hollow tube as a retaining member.

FIG. 7 shows an alternative embodiment of the invention.

FIG. 8 shows another alternative embodiment in section where the projecting portions of the engaging surfaces are rounded.

FIG. 9 shows an alternative embodiment where the projecting portions of the engaging surfaces are elongated.

FIG. 10 is a section of the invention with impact force from the front.

DETAILED DESCRIPTION

Figure 11:
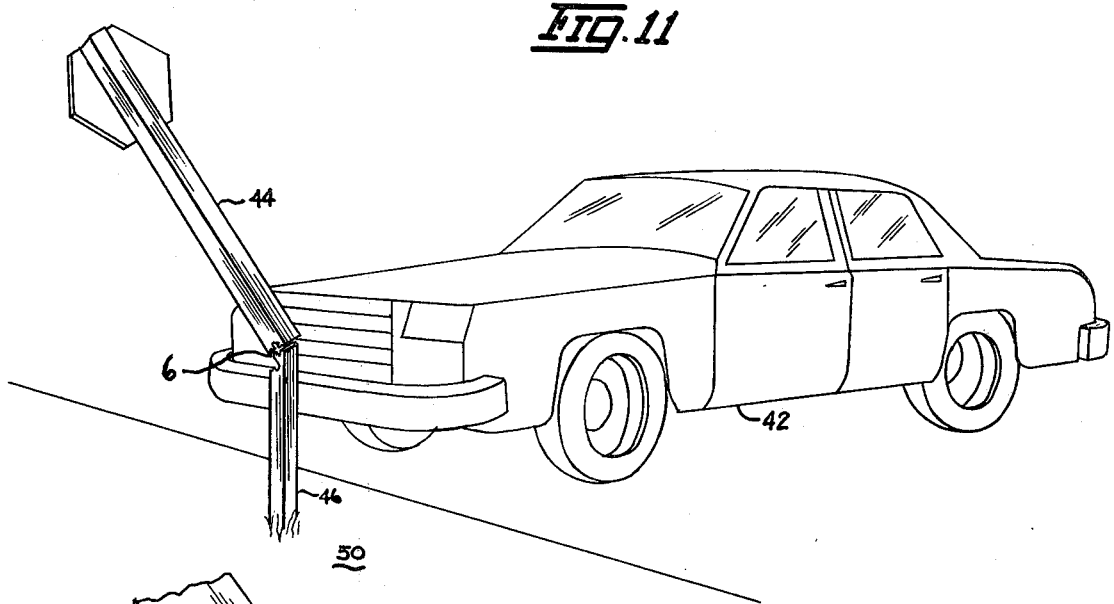
FIG. 11 is a perspective view of the invention incorporated in a signpost with shear force applied from side.

Referring to the drawings and especially to FIG. 1, the invention 6 is shown as part of sign post 2 with base 4. An automobile 40 has left roadway 52 and has struck post 2, with sufficient impact force to cause disengagement of connection 6 between post 2 and base 4. FIG. 10 shows a closeup view of the connection 6 in the process of detachment due to impact force in direction 60 such as is applied by automobile 40 in FIG. 1. Retaining member 12 has deformed, allowing structural member 8 to disengage from structural member 10. The engaging surface of member 8, which is made up of projecting portion 26, first planar portion 27, recessed portion 28, and second planar portion 30, has disengaged from the engaging surface of member 10, which is made up of projecting portion 18, recessed portion 25, first planar portion 20, and second planar portion 33. The set of opposed surfaces 32 of member 8 has moved relative to the set of opposed surfaces 16 of member 10, causing deformation of retaining member 12, relative to its axis. As is apparent from FIG. 10, retaining member 12 is destroyed if it is not of sufficient resiliency, while structural members 8 and 10 are left intact. The connection may be reassembled by engaging structural members 8 and 10 by abutting first planar portion 20 of structural member 10 with second planar portion 30 of structural member 8, projecting portion 18 with recessed portion 28, second planar portion 33 with first planar portion 27, and projecting portion 26 with recessed portion 25. Abutment of these portions will cause surfaces 16 and 32 to be in opposed space relation, thereby enclosing space 34 (as shown in FIG. 3), wherein a replacement retaining member 12 is inserted. By appropriate choice of material for retaining member 12, the user may select the force required in direction 60, which will cause deformation of retaining member 12, allowing structural members 8 and 10 to separate.

Referring to FIG. 2, the details of connection 6 are shown. Structural member 8 has an engaging surface comprising second planar portion 30, (which is disposed angularly to side edge 21), recessed portion 28, projecting portion 26, and first planar portion 27 (which is disposed angularly to side edge 29). Structural member 8 also has a set of oppositely spaced surfaces 32, which when structural members 8 and 10 are in engagement, creates with set of oppositely spaced surfaces 16 the enclosed space 34, as said space is shown in FIG. 3. Structural member 10 has a set of engaging surfaces comprising first planar portion 20, (which is angularly disposed to side edge 23), projecting portion 18, recessed portion 25, and second planar portion 33, (which is angularly disposed to side edge 35). Retaining member 12 with ends 15 and sides 14 is inserted in the space enclosed by oppositely spaced surfaces 32 and 16 when members 8 and 10 are in engagement. In FIG. 3, said space 34 is shown.

FIG. 3 displays an embodiment of the invention when members 8 and 10 are in engagement with retaining member 12 disposed in enclosed space 34. In this embodiment, retaining member 12 is a solid, cylindrical rod and space 34 is a four-sided polygon. As is shown, the sides of retaining member 12 touch the walls (made up of opposite surfaces 16 and 32 seen in FIG. 2) of space 34. The areas of space 34 which are not occupied by retaining member 12, are available to receive the deformed portions of retaining member 12 when a change in cross section of space 34 occurs because of opposing forces being applied to members 8 and 10.

FIG. 4 is a side elevation of the embodiment shown in FIG. 3. Retaining member 12 is disposed within the engaged portions of members 8 and 10.

FIG. 5 is a section along line 5—5 of FIG. 4. Retaining member 12 is shown disposed in space 34, which extends through the engaged portions of members 8 and 10.

FIG. 6 discloses engaged members 8 and 10 forming space 34. In this embodiment, retaining member 12 is a hollow tube while space 34 is of square cross section.

FIG. 7 discloses a variation where first planar portion 20 of member 10 is disposed at an angle other than perpendicular to side edge 23, while second planar portion 33 is disposed perpendicularly to side edge 35 of member 10.

FIG. 8 is a variation where projecting portion 26 of structural member 8 is rounded and engages a rounded recessed portion 25 of member 10. Similarly projecting portion 18 of structural member 10 engages a rounded recess 28 of structural member 8.

FIG. 9 illustrates that projecting portions 26 and 18 of structural members 8 and 10, respectively, may be elongated with concomitant deepening of recesses 25 and 28.

Figure 12:
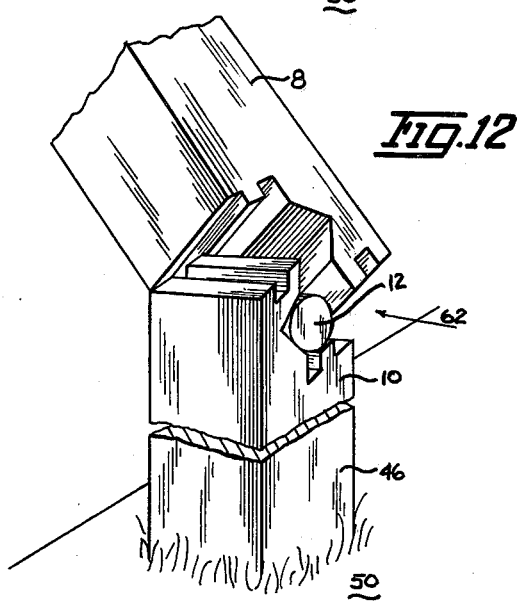
FIG. 12 is a perspective view of the invention disengaging, due to force from side.

FIG. 11 illustrates that connection 6 will detach due to impact force from an automobile 42 impinging in a direction orthogonal to the direction of the impact force shown in FIG. 1. A close up of the connection is shown in FIG. 12, showing said connection in the process of detachment. Impact force in direction 62 is applied to structural member 8, while a resistive force is applied to structural member 10 due to its being part of base 46 implanted in earth 50. Structural member 8 will disengage from structural member 10 by tipping off, thereby deforming part or all of retaining member 12 relative to its axis. Again, structural members 8 and 10 are left intact for reuse and may be easily re-engaged and held in engagement by a replacement retaining member 12. The selection of material and configuration of retaining member 12 controls the selected force above which an impact force on member 8 and opposing resistive force on member 10 will cause disengagement of the connection between structural members 8 and 10.

Figure 13:
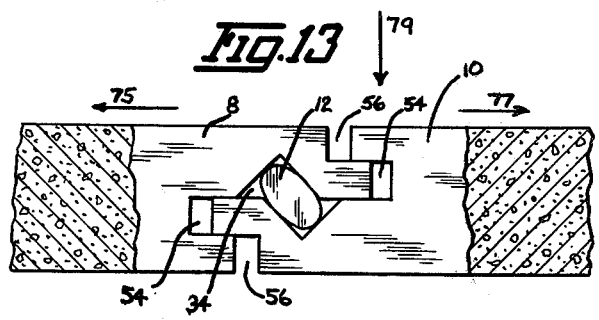
FIG. 13 shows an alternative use of the invention as a pavement joint.

FIG. 13 demonstrates an embodiment of the invention which could be used for an expansion joint. Retaining member 12 is of a resilient material. Structural member 8 is shown partially disengaged from structural member 10 due to imposition of force in direction 75 upon structural member 8 and imposition of opposing force in direction 77 upon structural member 10. The cross section of space 34 is shown after change, thus causing deformation of retaining member 12. Before the application of forces in direction 75 and 77, space 34 would have been a four sided polygon, while retaining member 12 would have been of circular cross section. Gaps 54 and 56 are formed when forces in directions 75 and 77 are applied. The connection will not wholly disengage unless forces in directions 75 and 77 exceed a selected value, which is determined by the resiliency of retaining member 12. So long as total disengagement is not effected, force in direction 79 upon the connection will be resisted by the connection.

Having described the invention, I claim:

1. In a pair of structural members having a separable connection therebetween, the connection maintaining the members in connected engagement until imposition of an impact force upon one member in one direction and a resistive force upon the other member in the opposite direction, the connection including engaging portions of each of the members having a first set of respective surfaces in engagement with each other and a second set of respective surfaces in opposed spaced relation to each other and defining a space through the members, movement of the members in said opposite direction relative to each other effecting a change in the cross sectional area of said space and a retaining member inserted in said space to prevent change in the cross sectional area of said space, the improvement comprising a retaining member disposed in said space and having an axis parallel to the axis of said space, the retaining member having exterior surfaces in engagement with the surfaces of said opening, the retaining member being deformable in cross sectional area relative to its said axis by the surfaces of said opening upon imposition of an impact force upon one member in one direction and a resistive force upon the other member in the opposite direction above a selected value of force.

2. A connection between two structural members wherein said members each have a connecting surface between side edges of the members, said connecting surfaces each have a first planar portion disposed angularly to the side edges of the member terminating in a projecting portion and a second planar portion disposed angularly to the side edges of the member terminating in a recessed portion, said connecting surfaces are identical and oppositely-oriented and are positioned surface to surface, thereby engaging the projecting portion of the surface of one member with the recessed portion of the surface of the other member and abutting the first planar portion of the surface of one member with the second planar portion of the surface of the other member, the positioning of the surfaces creating an enclosed space through the members, a deformable retaining member of cross section different from the cross section of the enclosed space, inserted in said space coaxially with said space and engaging portions of the walls of said space, the deformable retaining member deforming relative to its axis when opposing forces are applied to the two members.

3. The connection of claim 2 where the space is of four-sided polygonal cross section and the retaining member is of circular cross section.

4. The connection of claim 2 where the retaining member is deformable only when the opposing forces are above a selected value.

5. In a connection between two structural members wherin said members have identical but oppositely-oriented connecting surfaces in opposite engagement, forming a space, and a retaining member inserted in said space to hold the members in engagement, the improvement comprising the retaining member having an axis parallel ot the axis of said space, the surfaces of said retaining member being engaged with the surfaces of said space, said retaining member being deformable relative to its axis when an impact force in one direction is applied to one of the members and a resistive force in the opposite direction is applied to the other member.

6. The improvement of claim 5, wherein said retaining member deforms only upon imposition of forces above a selected value.

7. The improvement of claim 5, wherein the retaining member is of different cross section than the cross section of the space.

8. The improvement of claim 5, wherein the retaining member is a hollow bar.

9. The improvement of claim 5, wherein the retaining member is a bar of resilient material.

* * * * *